May 9, 1933. A. DINA 1,907,754
TILTING AND ADJUSTING DEVICE FOR MOTION PICTURE APPARATUS
Filed May 29, 1930 5 Sheets-Sheet 1
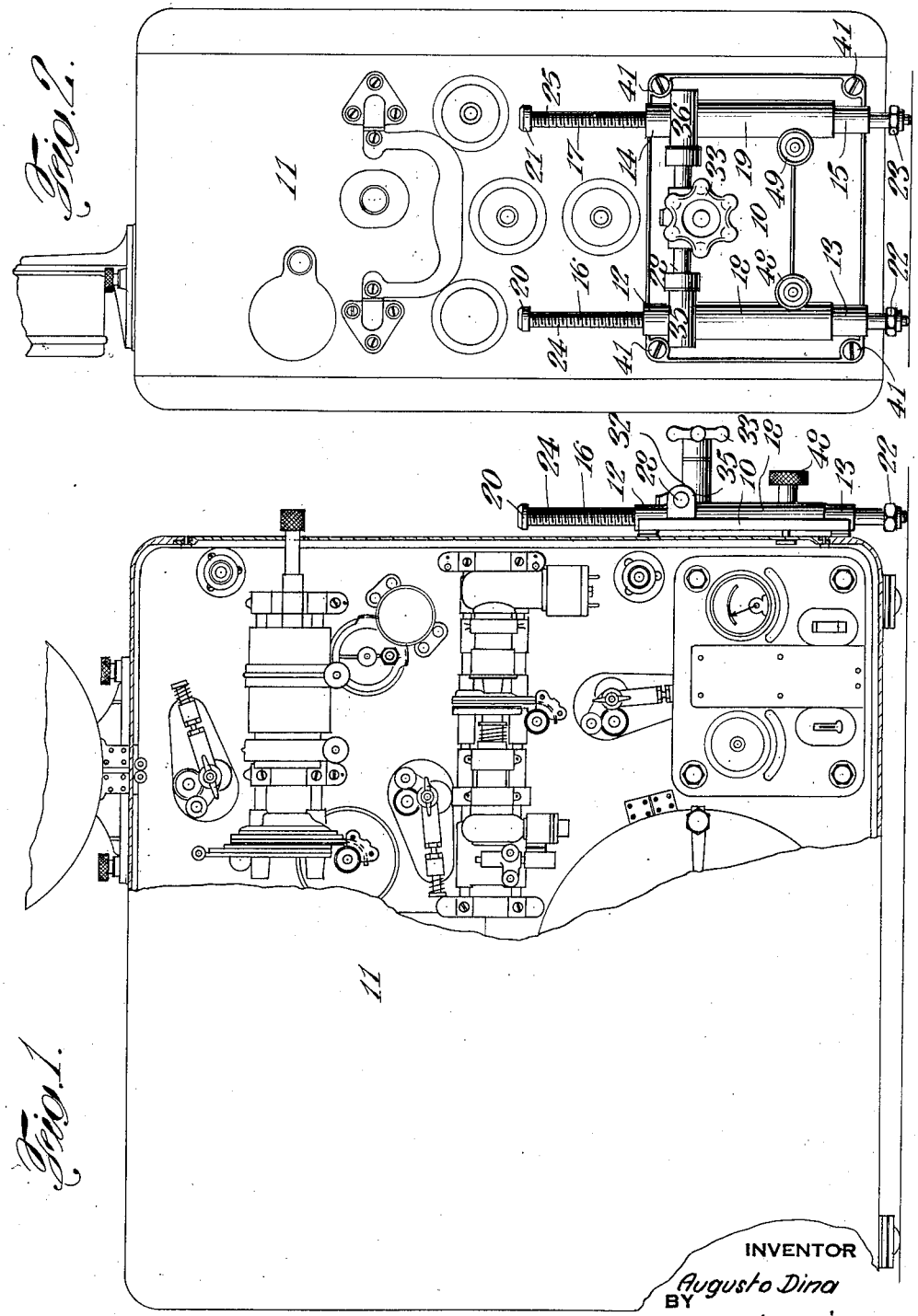
INVENTOR
Augusto Dina
BY
Austin + Dix
ATTORNEYS May 9, 1933.　　　　A. DINA　　　　1,907,754
TILTING AND ADJUSTING DEVICE FOR MOTION PICTURE APPARATUS
Filed May 29, 1930　　　5 Sheets-Sheet 2
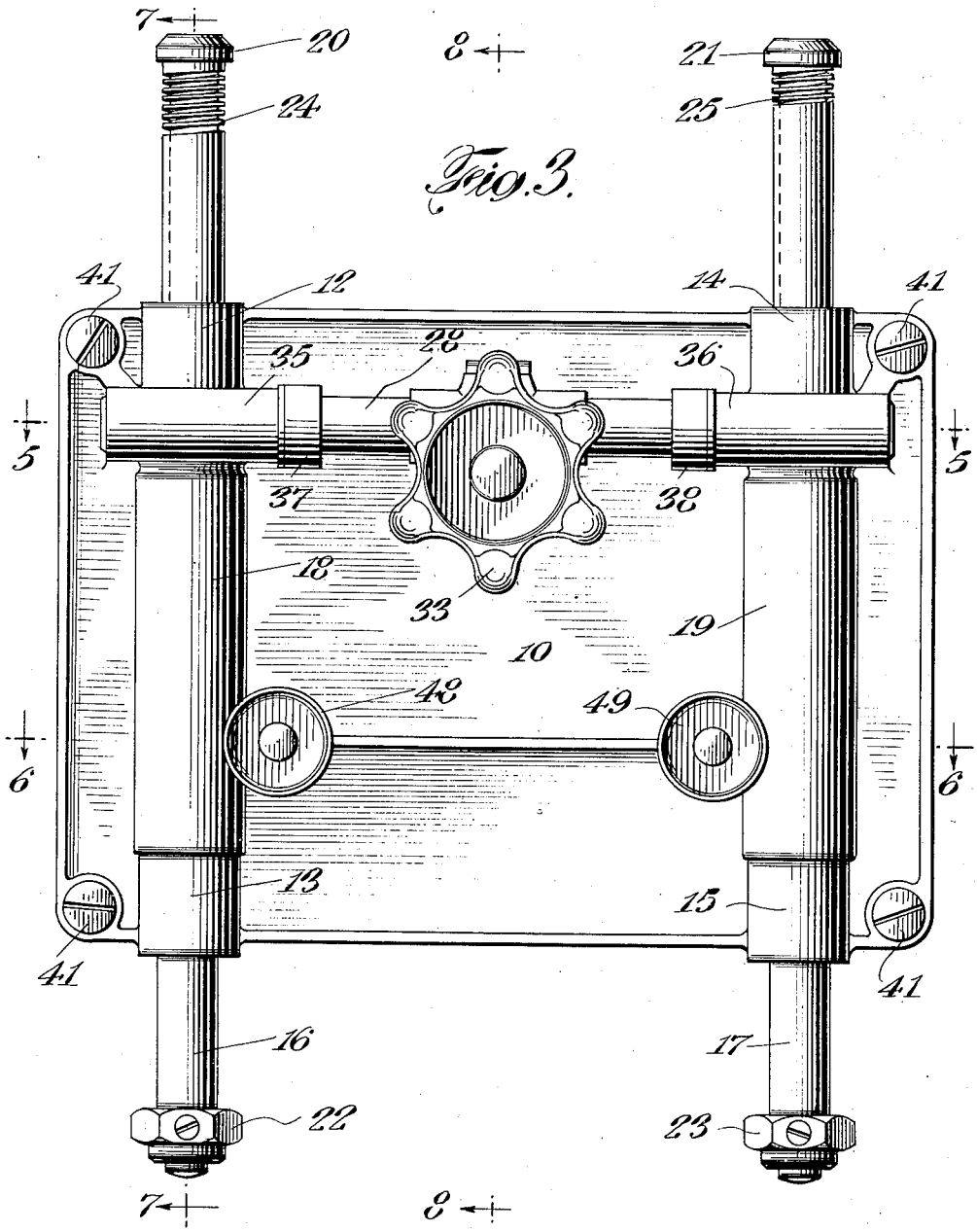
INVENTOR
Augusto Dina
BY
Austin + Dix
ATTORNEYS May 9, 1933. A. DINA 1,907,754

TILTING AND ADJUSTING DEVICE FOR MOTION PICTURE APPARATUS

Filed May 29, 1930   5 Sheets-Sheet 3

INVENTOR
Augusto Dina
BY
Austin + Dix
ATTORNEYS

May 9, 1933.  A. DINA  1,907,754
TILTING AND ADJUSTING DEVICE FOR MOTION PICTURE APPARATUS
Filed May 29, 1930    5 Sheets-Sheet 4
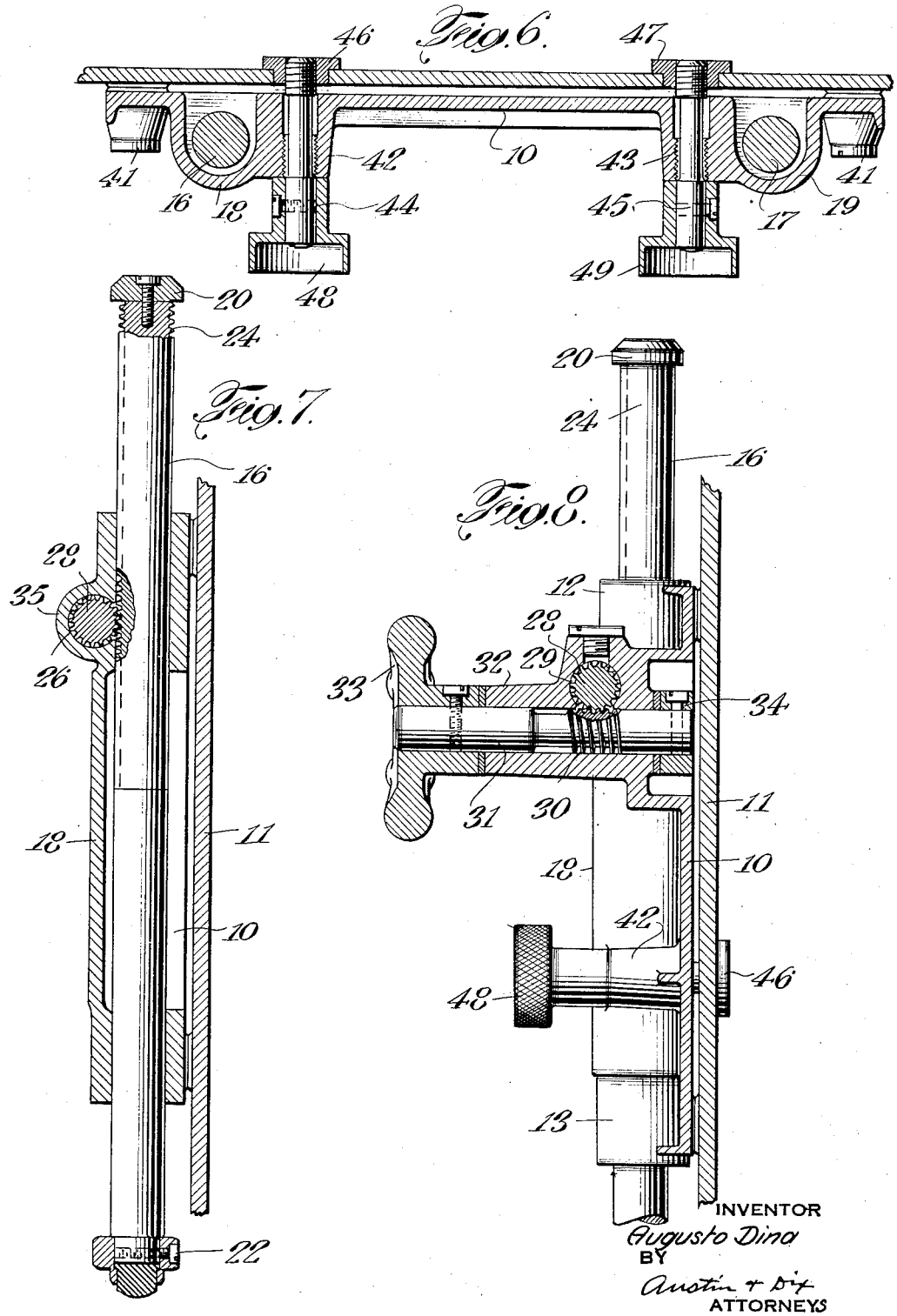
INVENTOR
Augusto Dina
BY
Austin + Dix
ATTORNEYS May 9, 1933. A. DINA 1,907,754

TILTING AND ADJUSTING DEVICE FOR MOTION PICTURE APPARATUS

Filed May 29, 1930 5 Sheets-Sheet 5

INVENTOR
Augusto Dina
BY
Austin + Dix
ATTORNEYS

Patented May 9, 1933

1,907,754

UNITED STATES PATENT OFFICE

AUGUSTO DINA, OF ELIZABETH, NEW JERSEY, ASSIGNOR TO INTERNATIONAL PROJECTOR CORPORATION, OF NEW YORK, N. Y., A CORPORATION OF DELAWARE

TILTING AND ADJUSTING DEVICE FOR MOTION PICTURE APPARATUS

Application filed May 29, 1930. Serial No. 456,954.

This invention relates to a device for tilting and adjusting motion picture apparatus with particular reference to the tilting and adjusting of projectors to permit the proper and desired direction of the projection beam of light.

A main object of the invention is to provide a simple, compact, durable, and efficient device which may readily be attached to any apparatus such as a moving picture projector, camera, or the like, to permit the optical axis of the beam of light projected thereby or entering the apparatus to be adjusted at will.

A further object is to provide a simple and efficient device whereby the machine or apparatus will be readily adjusted or tilted with respect to widely varying kinds of surfaces on which it may be supported and to also be adjusted in a variety of different positions on any given surface.

Further and more specific objects, features, and advantages will more clearly appear from the detailed description given below when taken in connection with the accompanying drawings which form part of the specification and which illustrate one present preferred form of the invention.

In general terms the invention includes a simple and compact device in the form of a frame or plate which can be easily and yet firmly attached to a face of the machine to be adjusted such as a camera or projector so as to tilt or adjust the machine with respect to the supporting surface or to support it in the usual level position on a surface which itself is not level.

Briefly and broadly expressed the invention includes on this frame a plurality of adjusting or levelling elements such as rods which are mounted for independent adjustment. That is to say for adjustment independently of each other and of the frame on which they are mounted. The invention includes a common operating means which ordinarily is employed to operate the levelling elements simultaneously. Thus each adjusting element such as the rods can be adjusted to support the machine or apparatus in a tilted position on a level platform or support, or they may be separately adjusted to dispose the apparatus in any desired level position from the surface of an uneven support. After such relative adjustment, then the elements may be moved in unison to raise or lower the front of the machine after the levelling has been completed. Ordinarily the apparatus is disposed on a level support and the functions of the device in that case are usually merely to raise and lower one end of the apparatus so as to permit the direction of the light beam leaving or entering the apparatus. In the case of the projectors the beam can thus be directed so that it falls properly on the screen or similar surface.

These separately adjustable elements such as the supporting and levelling rods are ordinarily connected to a common operating shaft which is operated by a single element such as a knob so that turning the knob in one direction will raise the desired end of the machine and turning it in the other direction will lower that end of the machine and thus give the direction desired of the beam.

The device herein is particularly advantageous in connection with speaking movie machine and motion picture projectors where the centering of the beam on the screen is of importance for the pleasure and convenience of the patrons of the theatre.

The present preferred form of the invention is illustrated in the drawings in which:

Fig. 1 is a side elevation with a portion of the casing broken away, and showing the adjusting device attached to the front of the casing;

Fig. 2 is a front elevation of the projector or machine with the adjusting device attached thereto;

Fig. 3 is an enlarged front view of the adjusting device;

Fig. 6 is a cross section taken on the line 6—6 of Fig. 3;

Fig. 7 is a cross section taken on the line 7—7 of Fig. 3;

Fig. 8 is a cross section taken on the line 8—8 of Fig. 3; and

Figure 4:
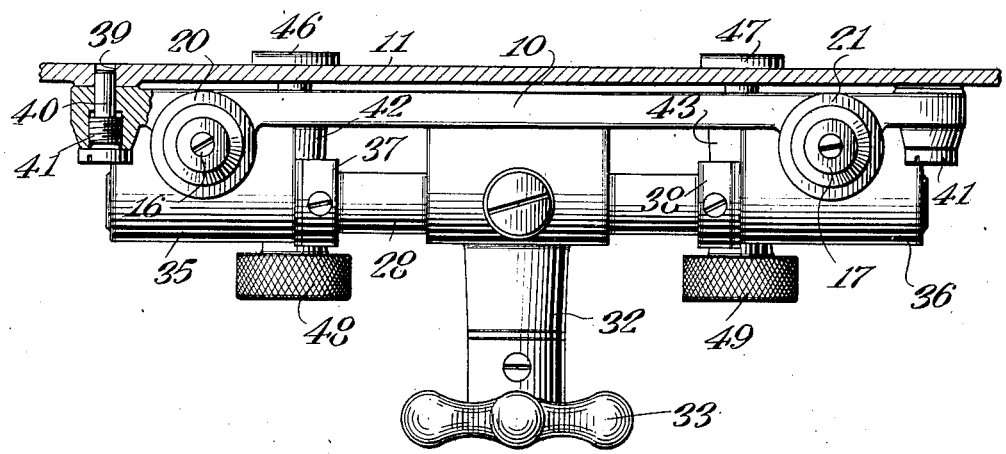
Fig. 4 is a top plan view of the device.
Figure 5:
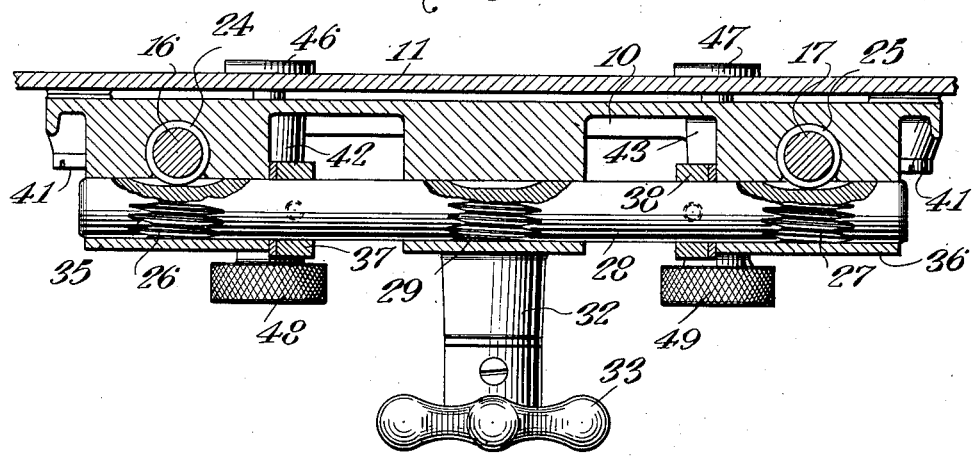
Fig. 5 is a cross section taken on the line 5—5 of Fig. 3.

Figs. 9, 10, 11, and 12 are fragmentary front views of the apparatus showing the device in several adjusted positions.

The preferred form of the invention is applied as shown in Fig. 1, to a projector employed for the projection of speaking moving pictures in which the pictures on the film are projected through and along one axis and then the film passes through another light apparatus whereby the sound striata thereon are illuminated and thrown on a light sensitive cell such as a selenium cell where the light variations are transformed into electrical variations which are later transformed into sound. It is of course very desirable that such a projector have its projection beam properly alined with the surface or screen on which it is to be projected and to that end I have provided the invention which is in the form of a plate 10 which may be readily attached to any desired portion of the casing 11 of the projector or other apparatus to which the plate 10 may be fastened and which requires adjustment or alinement for one purpose or another. Preferably in the case of the projector the plate 10 is fastened to the front wall thereof.

As shown enlarged in Fig. 3, the adjusting device comprises the plate 10 above mentioned. This plate 10 by reason of pairs of spaced journals 12, 13, and 14, 15 supports two spaced preferably parallel shafts, elements or rods 16 and 17, which are slidably disposed therein. The journals thus paired are respectively connected by sleeves or enclosing casings such as 18 and 19. The top and bottom of the rods 16 and 17 are preferably provided with stop elements such as 20, 21, 22, and 23, thus limiting the amount of upward and downward movement of the rods. The rods along a portion of their length preferably at their upper ends are threaded or provided with suitable teeth preferably to form rack elements such as 24 and 25 adapted to mesh with gear teeth 26 and 27 on opposite ends of a control and operating shaft 28.

This shaft 28 has gear teeth formed thereon as at 29 and these teeth 29 are engaged by a worm gear such as 30 on an operating or adjusting stub shaft 31 journalled in a hub or sleeve 32 mounted on the plate 10 and preferably extending at right angles to the face thereof. The outer end of this stub shaft 31 carries or bears an operating handle such as 33. The opposite end of the stub shaft 31 has a positioning collar 34 thereon.

The operating shaft 28 is supported in journals 35 and 36 spaced apart on the plate 10 in the neighborhood of the journals 12 and 14 and has fastened thereto on the inside face of each of these journals a collar such as 37 and 38 which prevents longitudinal movement of the shaft 28.

The plate 10 may be positioned with accuracy on the front of the apparatus or machine 11 by having in the face of the machine a series of properly spaced and located holes such as 39 which receive the ends of pins such as 40 disposed at the proper points on the plate 10. These pins 40 may be disposed on the ends of headed threaded member such as 41 as seen clearly in Fig. 4. This means positions the plate 10 properly with respect to the machine to which it is fastened. To hold the plate 10 to the front or other face of the machine there is provided as seen in Fig. 6 a plurality of spaced bosses such as 42 and 43 which act as journals for stub shafts such as 44 and 45 extending therethrough. The inner ends of these stub shafts are threaded and receive on their inner ends nuts such as 46 and 47 lying in back of plate 11 of the machine. Preferably these nuts 46 and 47 have portions setting in holes in the frame of the machine as shown in Fig. 6. The other ends of these stub shafts 44 and 45 have sleeved heads or knobs such as 48 and 49 thereon which enable the stub shafts to be manipulated to tighten up the nuts to hold the plate 10 firmly against the face of the apparatus.

It will be observed that each of the rods such as 16 and 17 can be turned to move them longitudinally independent of any movement of the operating shaft 28. This possibility is by reason of the rack and gear arrangement existing between them. Therefore as seen in Figs. 9 to 12 inclusive the frame of the machine can be adjusted to be disposed at any desired angle of inclination with respect to the supporting surface and the two rods may be operated simultaneously before or after separate adjustment by means of the movement of the shaft 28.

Figure 9:
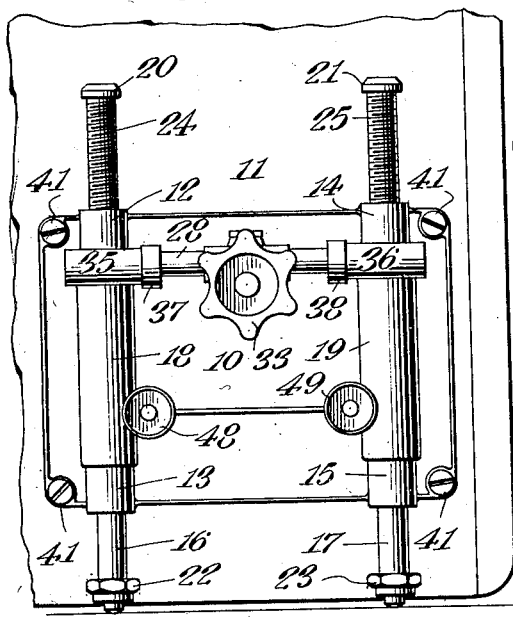
Figure 10:
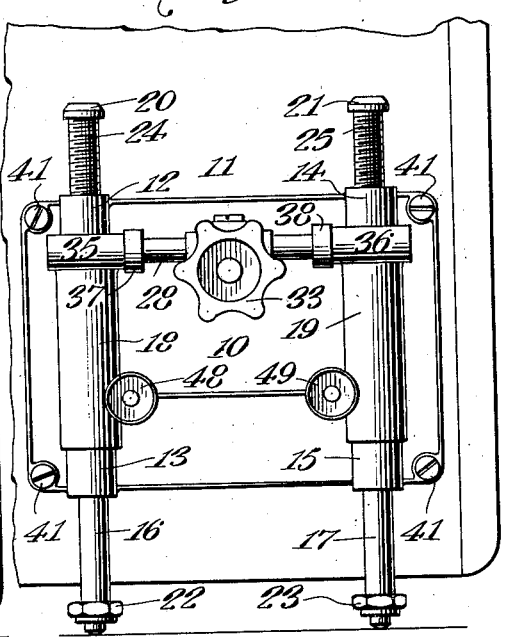
Figure 11:
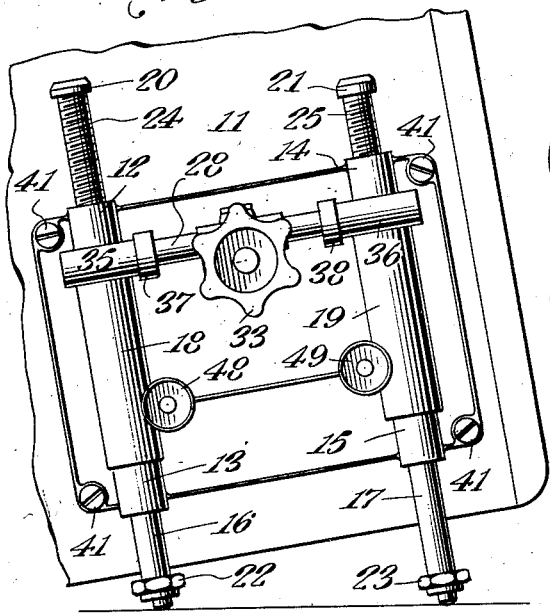
Figure 12:
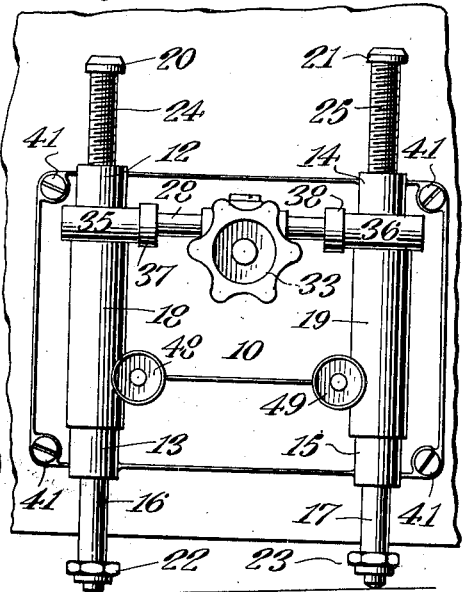

In the operation of the device, it is positioned against the frame or face of the machine 11 by alining the pins 40 with the holes 39 and then engaging the stub shafts 44 and 45 with the nuts 46 and 47 and then tightening up on the nuts thereby clamping the plate 10 firmly in position. If the frame of the machine is to be adjusted with the lower ends of the rods 16 and 17 in a horizontal plane then these rods are separately manipulated so that their lower ends are in the proper relation to each other. As stated above this separate manipulation is possible by reason of the fact that the rods are toothed to form a rack engaging with the teeth of the gears on the shaft 28. Therefore the rods can be operated to turn them without moving or otherwise affecting the shaft 28. The teeth of the rack on the rods 16 and 17 are formed with a slight pitch so that as these rods are thus independently turned they will move longitudinally. As shown in Fig. 9 the rods 16 and 17 are adjusted so that their lower ends are in a horizontal plane. Then when the knob 33 is turned one way or the other the shaft 28 is moved and both the rods or elements 16 and 17 are moved up or down to effect the lifting or the lowering of the front or the adjacent face of the machine. In Figs. 11 and 12 there are shown the rods 16 and 17 adjusted so that the machine can be supported on an inclined surface or in an inclined position on a flat horizontal surface as the case may be.

Thus the invention provides a simple, compact, durable, and efficient means whereby a projector, camera, or other device may be adjusted in a variety of positions with respect to a supporting surface by the simple manipulation of a single element. The one common operating member operates a plurality of elements such as the rods 16 and 17 which however can be separately manipulated so as to cause the device to allow for adjusting and supporting the frame or machine in unusual positions or on unusual surfaces. The plate is provided with a plurality of what may be called levelling or supporting elements which may be operated simultaneously by a single member but which may be operated and adjusted independently of each other and the operating element.

While the invention has been described in detail and with respect to a present preferred form thereof, it is not to be limited to such details or forms since many changes and modifications may be made and the invention embodied in other forms and modifications without departing from the spirit and scope of the invention in its broadest aspects. Hence it is desired to cover any and all forms and modifications of the invention which may come within the language or scope of any one or more of the appended claims.

What is claimed, is,

1. In combination with a speaking movie projector, a frame attachable to the front wall thereof, means on the frame to be alined with means on the projector to establish the frame in a definite position with respect to the front wall, means on the frame and the projector engaging with each other to hold the frame firmly against the front wall, when properly alined, supporting legs on said frame and spaced apart, means for separately adjusting and moving said legs to support the projector in any desired position on a support, and a single means for operating the legs together when desired.

2. An adjusting and tilting frame which comprises a plate, alining means on the plate, engaging means on the plate to hold it firmly to a member to be tilted or adjusted, supporting legs on the frame, means for separately adjusting and moving the legs, and a common means for moving the legs together when desired.

3. An adjusting and tilting frame which comprises a plate, supporting legs on the frame, said legs being adjustable and threadably mounted on the frame, an operating shaft geared to the legs, means for moving the legs independently of the operating shaft, and means for moving the operating shaft to move the legs together when desired.

4. An adjusting and tilting frame which comprises a plate, supporting legs on the frame, said legs being adjustable and threadably mounted on the frame, an operating shaft geared to the legs, means for moving the legs independently of the operating shaft, means for moving the operating shaft to move the legs together when desired, alining means on the plate, engaging means on the plate to hold it firmly to a member to be tilted or adjusted.

5. An adjusting and tilting frame which comprises a plate, spaced parallel supporting legs threadably and movably journalled on the plate, an operating shaft geared to the legs and extending at right angles thereto, means for turning said shaft to operate the legs simultaneously, means for moving each leg separately of the other and without moving the operating shaft, a plurality of spaced means to engage with a member to be tilted to aline the plate therewith, and means on the plate to engage the member to hold the plate firmly thereto.

6. An adjusting and tilting frame which comprises a plate, spaced parallel vertically disposed legs thereon and provided with threads, an operating shaft on the plate at right angles to the legs, gears on the shaft to engage the threads, the gears and threads being so engaged as to permit independent movement of the legs without operating the shaft.

In testimony whereof I have hereunto set my hand.

AUGUSTO DINA.